(12) United States Patent
Yoneda et al.

(10) Patent No.: US 9,395,946 B2
(45) Date of Patent: Jul. 19, 2016

(54) IMAGE VIEWING SYSTEM, ARBITRATING TERMINAL, IMAGE VIEWING METHOD, AND ARBITRATING METHOD

(71) Applicant: PANASONIC CORPORATION, Osaka (JP)

(72) Inventors: Aki Yoneda, Hyogo (JP); Tomokazu Ishikawa, Osaka (JP); Takahiro Nishi, Nara (JP); Hisao Sasai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 13/902,261

(22) Filed: May 24, 2013

(65) Prior Publication Data
US 2013/0328747 A1 Dec. 12, 2013

(30) Foreign Application Priority Data

May 25, 2012 (JP) .................................. 2012-120093
Jul. 6, 2012 (JP) .................................. 2012-153075

(51) Int. Cl.
G06F 3/14 (2006.01)

(52) U.S. Cl.
CPC ............ G06F 3/1423 (2013.01); G06F 3/1431 (2013.01); G06F 3/1454 (2013.01); *G09G 2354/00* (2013.01); *G09G 2370/20* (2013.01)

(58) Field of Classification Search
CPC ..... G06F 3/048; G06F 3/1431; G06F 3/1454; G06F 3/1423; G06F 2370/20; G06F 2354/00; G09G 2370/20; G09G 2354/00
USPC .................................... 345/1.3, 2.1, 2.2, 2.3
See application file for complete search history.

(56) References Cited

U.S. PATENT DOCUMENTS

| 2004/0046783 | A1* | 3/2004 | Montebovi ..................... 345/730 |
| 2007/0075915 | A1* | 4/2007 | Cheon et al. ................... 345/1.1 |
| 2009/0235281 | A1* | 9/2009 | Lu et al. ......................... 719/318 |
| 2010/0331082 | A1* | 12/2010 | Kim et al. ....................... 463/30 |
| 2012/0154265 | A1* | 6/2012 | Kim ......................... G06F 21/84 345/156 |
| 2013/0132859 | A1* | 5/2013 | Chou et al. ..................... 715/751 |

FOREIGN PATENT DOCUMENTS

JP 4332707 9/2009

* cited by examiner

*Primary Examiner* — Aneeta Yodichkas
*Assistant Examiner* — Saifeldin Elnafia
(74) *Attorney, Agent, or Firm* — Wenderoth, Lind & Ponack, L.L.P.

(57) ABSTRACT

An image viewing system according to the present disclosure includes (i) plural mobile terminals each including: a memory unit; an input receiving unit which receives an input for displaying an image selected by a user on the large display apparatus; and a display instructing unit which issues a first instruction to display the selected image on the large display apparatus, and (ii) a large display apparatus including: a large display; an arbitrating terminal determining unit which determines an arbitrating terminal; and a first display control unit which displays the image based on the instruction on the large display. The display instructing unit of the arbitrating terminal determines whether or not to cause the first display control unit to display the image indicated by the first instruction, and issues a second instruction to the large display apparatus to display an image according to a result of the determination.

16 Claims, 13 Drawing Sheets

FIG. 10
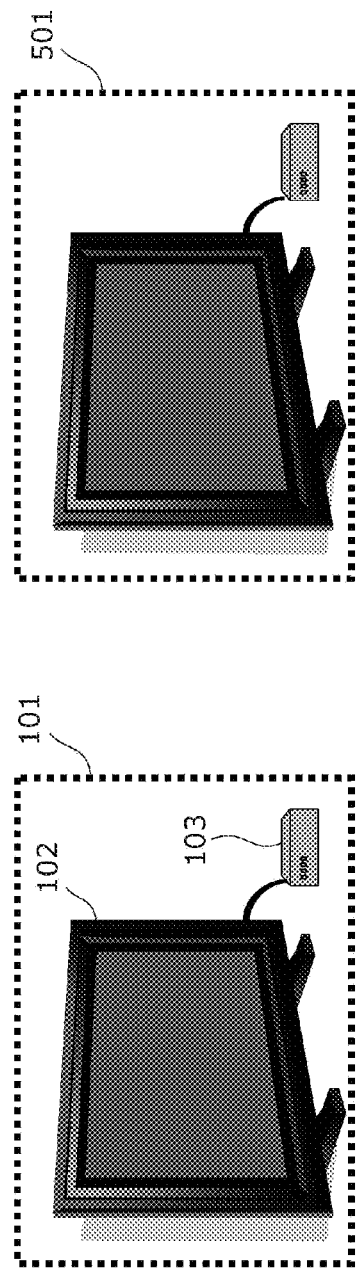
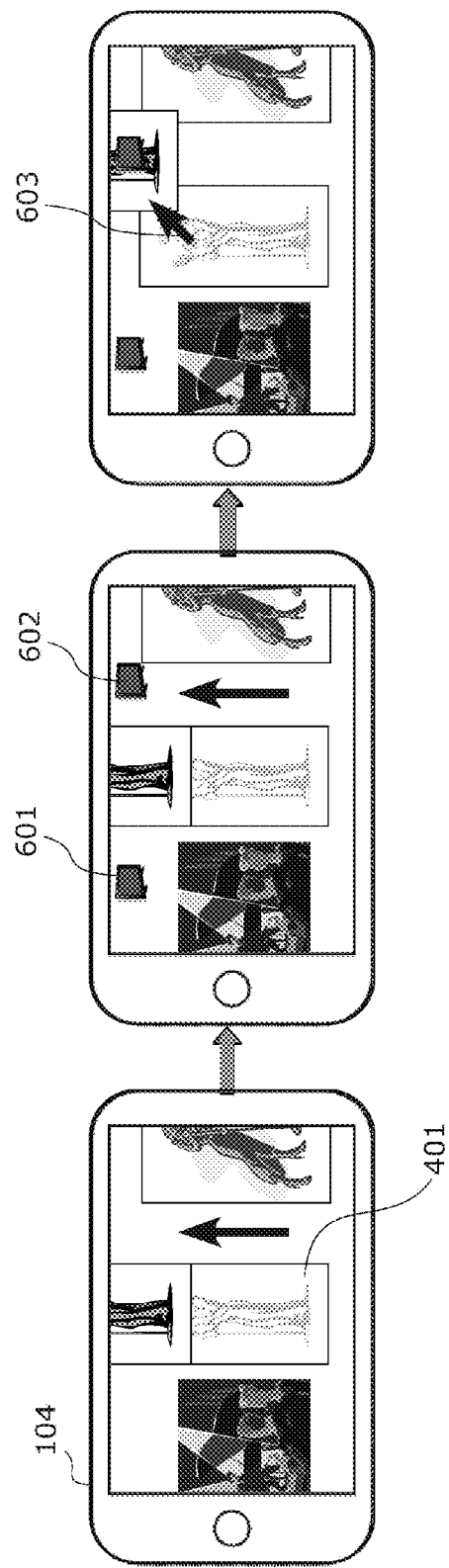

IMAGE VIEWING SYSTEM, ARBITRATING TERMINAL, IMAGE VIEWING METHOD, AND ARBITRATING METHOD

CROSS REFERENCE TO RELATED APPLICATION

The present application is based on and claims priority of Japanese Patent Application No. 2012-120093 filed on May 25, 2012 and Japanese Patent Application No. 2012-153075 filed on Jul. 6, 2012. The entire disclosure of the above-identified application, including the specification, drawings and claims is incorporated herein by reference in its entirety.

FIELD

The present disclosure relates to an image viewing system, an arbitrating terminal, an image viewing method, and an arbitrating method for displaying an image stored in a small terminal on a large display apparatus.

BACKGROUND

Recent years have seen a great proliferation of mobile terminals known as smartphones. Not only do smartphones have a telephone function, but they also have functions which have conventionally been performed by personal computers and the like, such as image shooting with a camera and image viewing. Thus, it is now a trend for people to use smartphones to perform all that has conventionally been performed using personal computers and the like.

Conventionally, to shoot and view digital images, a user has used a digital camera for shooting digital images and then used a personal computer for viewing the digital images on the computer display. Smartphones having both a large display and a high performance camera, however, allow both the image shooting and image viewing to be performed with a single smartphone. Such usage of the smartphones does not require the operation of transferring the digital images from a camera to a personal computer. This convenience and easy use are being favored by the users and have led many people to shoot and view digital images using smartphones.

Furthermore, with a gesture input, content stored in a mobile terminal can be displayed on a TV screen as disclosed in Patent Literature (PTL) 1.

CITATION LIST

Patent Literature

Japanese Patent No. 4332707

SUMMARY

Technical Problem

However, viewing digital photos on a smartphone is not the best way when more than one person wants to view the photos, because the screen is small.

The present disclosure has been conceived to solve this problem and provide a digital image viewing system which, when each of plural users has a smartphone, makes image viewing using a large television possible without giving other users a sense of discomfort.

Solution to Problem

An image viewing system according to an aspect of the present disclosure is an image viewing system including plural mobile terminals and a large display apparatus connected to each other via a network, each of the mobile terminals including: a memory unit configured to store one or more pieces of image data; an input receiving unit configured to receive a predetermined input for displaying on the large display apparatus an image indicated by a piece of image data selected by a user from among the one or more pieces of image data; and a display instructing unit configured to issue a first instruction to the large display apparatus to display on the large display apparatus the image indicated by the piece of image data selected by the user, based on the input received by the input receiving unit, and the large display apparatus including: a large display; an arbitrating terminal determining unit configured to determine one of the mobile terminals as an arbitrating terminal; and a first display control unit configured to display on the large display the image based on the instruction issued by the display instructing unit, wherein the display instructing unit of the one of the mobile terminals determined as the arbitrating terminal by the arbitrating terminal determining unit is further configured to receive first instructions issued by the display instructing units of the mobile terminals, determine whether or not to cause the first display control unit to display images indicated by the received first instructions, and issue a second instruction to the large display apparatus to cause the first display control unit to display an image according to a result of the determination, and the first display control unit of the large display apparatus is configured to display on the large display a first image based on the first instruction issued by the arbitrating terminal, and display on the large display a second image based on the first instruction issued by one of the mobile terminals which is different from the arbitrating terminal, in a second size smaller than a first size in which the first image is displayed.

When plural mobile terminals are brought in by their respective users and are easily connected to a network, and the users find an image to show to the others, this system allows the plural users to view the image using the large display apparatus. At this time, the individual mobile terminals can issue at any time the first instruction to display an image using the large display apparatus, without worrying about the other users. The mobile terminal determined as the arbitrating terminal can determine an image to be displayed from among the images indicated by the first instructions, and select image data to be displayed next on the large display in full-screen, for example. This produces a particularly advantageous effect of allowing two or more people to smoothly view the image data stored in the mobile terminals.

These general and specific aspects may be implemented using one or more methods.

Advantageous Effects

When each of plural users has a smartphone, an image viewing system, an arbitrating terminal, an image viewing method, and an arbitrating method make image viewing using a large television possible and allow two or more people to smoothly view image data stored in plural small terminals without giving other users a sense of discomfort.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 10 shows a method of operating a mobile terminal in an image viewing system according to Embodiment 4.

DESCRIPTION OF EMBODIMENTS

Figure 1:
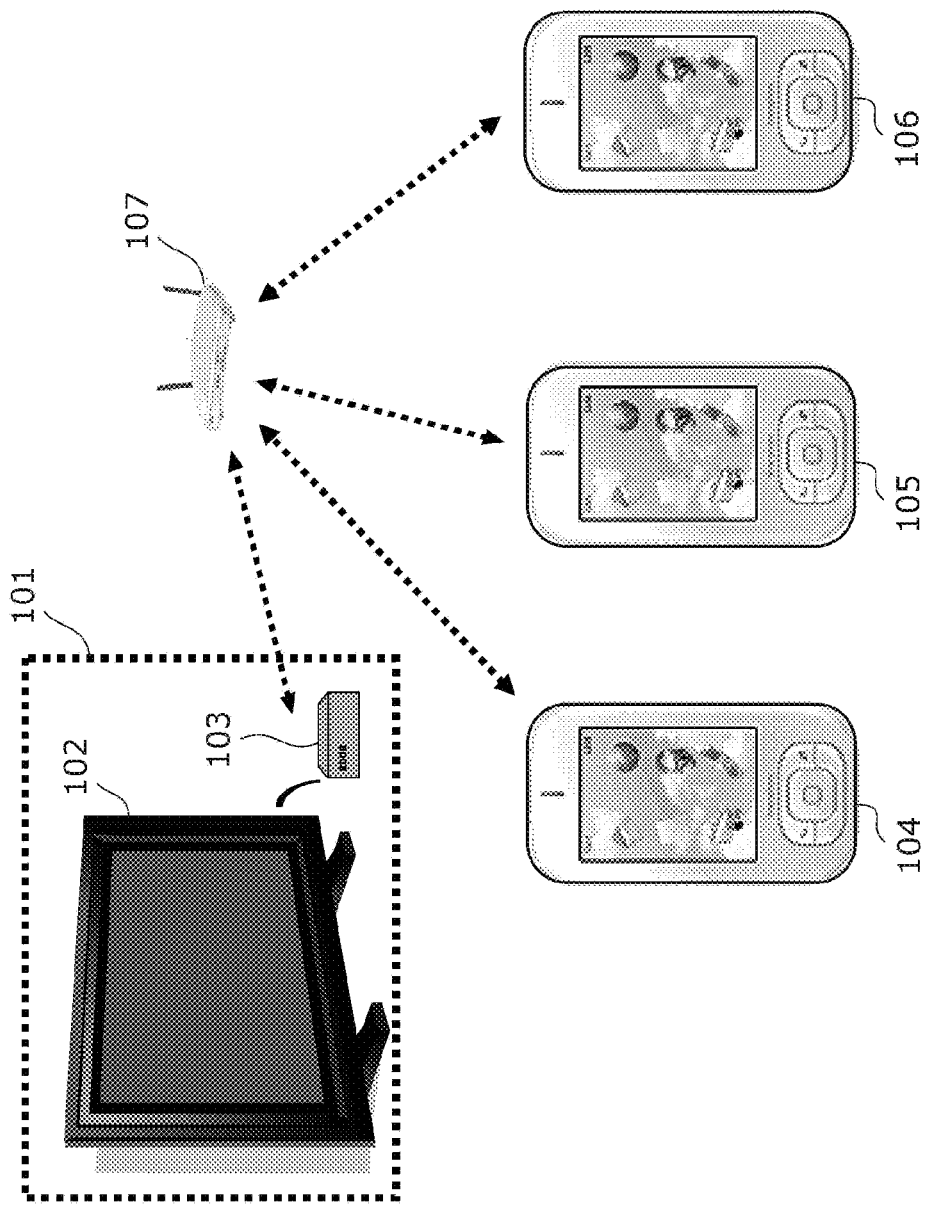
FIG. 1 shows an image viewing system according to Embodiment 1.

Underlying Knowledge Forming Basis of the Present Disclosure

When people meet for a gathering such as a party and view photos together, images are displayed on a large-screen television instead of a smartphone, for example. For example, with Apple TV (registered trademark) and iPhone (registered trademark) put on sale by Apple Incorporated, the Apple TV receives digital images stored in a mobile terminal (iPhone) and displays the digital images on a large television connected to the Apple TV. With this, when people gather to view photos, they can view the images on a large television having a large screen instead of a mobile terminal having a small screen.

The above-described conventional technique, however, does not properly function when each of plural users has a smartphone and wants to display a digital image stored in the smartphone on a large-screen television. For example, assume a user A and a user B both have a mobile terminal. If the user B attempts to display an image stored in a mobile terminal B of the user B on a large television when the user A is displaying and viewing on the large television an image stored in a mobile terminal A of the user A, the user B's image is displayed over the user A's image on the large television. This hinders the viewing of the user A's image displayed by the user A, thereby giving a sense of discomfort to the user A. If the number of users is small, such as two, the users can make an arrangement to take turns using the large television. When there are four or five users, however, the arbitration becomes difficult, and it becomes substantially impossible to display the images stored in their respective smartphones on the large television.

In order to solve the aforementioned problem, an image viewing system according to an aspect of the present disclosure is an image viewing system including plural mobile terminals and a large display apparatus connected to each other via a network, each of the mobile terminals including: a memory unit configured to store one or more pieces of image data; an input receiving unit configured to receive a predetermined input for displaying on the large display apparatus an image indicated by a piece of image data selected by a user from among the one or more pieces of image data; and a display instructing unit configured to issue a first instruction to the large display apparatus to display on the large display apparatus the image indicated by the piece of image data selected by the user, based on the input received by the input receiving unit, and the large display apparatus including: a large display; an arbitrating terminal determining unit configured to determine one of the mobile terminals as an arbitrating terminal; and a first display control unit configured to display on the large display the image based on the instruction issued by the display instructing unit, wherein the display instructing unit of the one of the mobile terminals determined as the arbitrating terminal by the arbitrating terminal determining unit is further configured to receive first instructions issued by the display instructing units of the mobile terminals, determine whether or not to cause the first display control unit to display images indicated by the received first instructions, and issue a second instruction to the large display apparatus to cause the first display control unit to display an image according to a result of the determination, and the first display control unit of the large display apparatus is configured to display on the large display a first image based on the first instruction issued by the arbitrating terminal, and display on the large display a second image based on the first instruction issued by one of the mobile terminals which is different from the arbitrating terminal, in a second size smaller than a first size in which the first image is displayed.

When plural mobile terminals are brought in by their respective users and are easily connected to a network, and the users find an image to show to the others, this system allows two or more people to view the image using the large display apparatus. At this time, the individual mobile terminals can issue at any time the first instruction to display an image using the large display apparatus, without worrying about the other users. The mobile terminal determined as the arbitrating terminal can determine an image to be displayed from among the images indicated by the first instructions, and select image data to be displayed next on the large display in full-screen, for example. This produces a particularly advantageous effect of allowing two or more people to smoothly view the image data stored in the mobile terminals.

For example, when the second instruction is received from the arbitrating terminal, the first display control unit of the large display apparatus may display, on the large display and in the first size, the second image displayed on the large display in the second size, based on the second instruction.

For example, the arbitrating terminal determining unit may determine, as the arbitrating terminal, one of the mobile terminals whose connection status with the network satisfies a predetermined condition.

For example, each of the mobile terminals may further include: a small display; and a second display control unit configured to control content displayed on the small display, and when the display instructing unit of the mobile terminal determined as the arbitrating terminal receives the first instructions from the display instructing units of the mobile terminals, the second display control unit of the mobile terminal determined as the arbitrating terminal may display on the small display of the mobile terminal determined as the arbitrating terminal an indication that the first instructions have been received.

For example, the large display apparatus may further include a display instruction receiving unit configured to receive the first instructions issued by the display instructing units of the mobile terminals, and the first display control unit may display on the large display of the large display apparatus an indication of the first instructions received by the display instruction receiving unit.

For example, the input receiving unit may receive a gesture input as the predetermined input, and when the input receiving unit receives the gesture input, the display instructing unit may issue, as the first instruction, an instruction to the large display apparatus to display an image indicated by a piece of image data for which the gesture input has been made.

For example, the input receiving unit may receive a flick input as the gesture input.

For example, each of the mobile terminals may further include a direction determining unit configured to determine whether or not a direction of the flick input received by the input receiving unit is a direction from the mobile terminal to the large display apparatus, and when the direction determining unit determines that the direction of the flick input is the direction from the mobile terminal to the large display apparatus, the display instructing unit may issue, as the first instruction, an instruction to the large display apparatus to display an image indicated by a piece of image data for which the flick input has been made.

For example, when the gesture input received by the input receiving unit is a drag of the image indicating the piece of image data for a first predetermined distance or longer, the display instructing unit may issue, as the first instruction, an instruction to the large display apparatus to display the image indicated by the piece of image data for which the gesture input has been made.

For example, when the gesture input received by the input receiving unit is the drag of the image indicating the piece of image data for the first predetermined distance or longer, the second display control unit may display on the small display the image moving in a direction of the drag, and when the gesture input received by the input receiving unit is a drag of the image indicating the piece of image data for a distance less than the first predetermined distance, the second display control unit may display on the small display the image moving back to an original position.

For example, when the large display apparatus includes plural large display apparatuses and the gesture input received by the input receiving unit is a drag of the image indicating the piece of image data for a second predetermined distance which is less than the first predetermined distance, the second display control unit may display on the small display plural icons each corresponding to a different one of the large display apparatuses, and the display instructing unit may issue, as the first instruction, an instruction to display the image indicating the piece of image data, to one of the large display apparatuses which is indicated by one of the icons which corresponds to an end position of the drag.

For example, the first display control unit may display (i) the image indicated by the first instruction issued by the display instructing unit of at least one of the mobile terminals and (ii) information for identifying the at least one of the mobile terminals which has issued the first instruction.

For example, the large display apparatus may further include a broadcast receiving unit capable of receiving television broadcast, and when the first instruction is received from any one of the mobile terminals while the television broadcast received by the broadcast receiving unit is being displayed on the large display, the first display control unit may display the image indicated by the first instruction on the large display.

An arbitrating terminal according to an aspect of the present disclosure is an arbitrating terminal which is one of mobile terminals included in the above-described image viewing system, the display instructing unit of the arbitrating terminal being further configured to receive first instructions issued by the display instructing units of the mobile terminals, determine whether or not to cause the large display apparatus to display images indicated by the received first instructions, and issue a second instruction to the large display apparatus to cause the large display apparatus to display an image according to a result of the determination.

These general and specific aspects may be implemented using one or more methods.

Hereinafter, an image viewing system, an arbitrating terminal, an image viewing method, and an arbitrating method according to an aspect of the present disclosure are specifically described with reference to the Drawings.

Each of the embodiments described below shows a specific example of the present disclosure. The numerical values, shapes, structural elements, steps, the processing order of the steps etc. shown in the following embodiments are mere examples, and therefore do not limit the present disclosure. Furthermore, among the structural elements in the following embodiments, structural elements not recited in any of the independent claims representing the most generic concepts are described as arbitrary structural elements.

Embodiment 1

Figure 2:
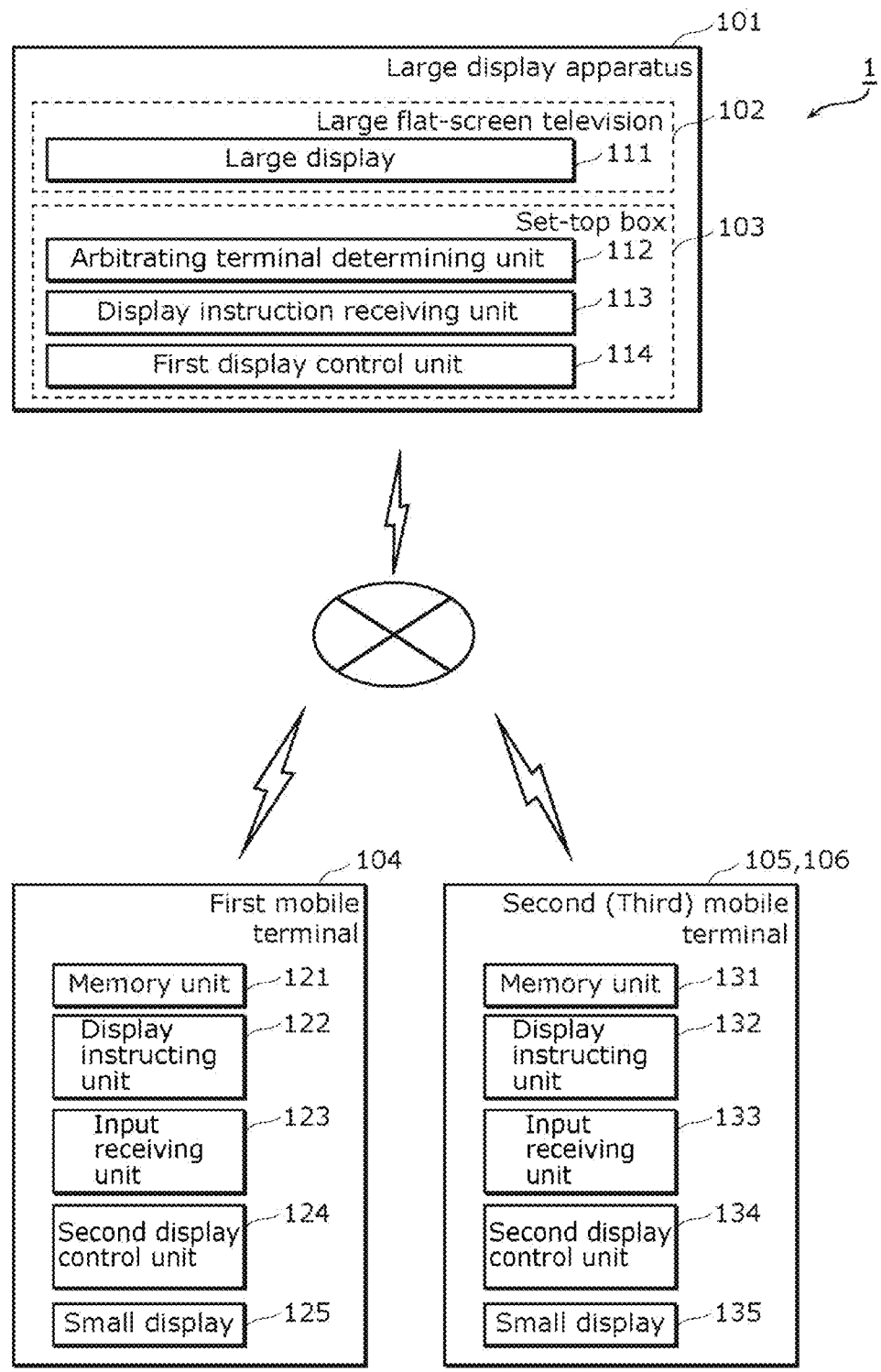
FIG. 2 is a functional block diagram of an image viewing system according to Embodiment 1.

As shown in FIG. 1 and FIG. 2, an image viewing system 1 according to an aspect of the present disclosure includes plural mobile terminals 104 to 106 and a large display apparatus 101 connected to each other via a network through a wireless LAN station 107.

FIG. 1 shows an image viewing system according to Embodiment 1. FIG. 2 is a functional block diagram of the image viewing system according to Embodiment 1.

In Embodiment 1, the large display apparatus 101 includes a general-purpose large flat-screen television 102 and a set-top box 103. As shown in FIG. 2, the large flat-screen television 102 includes a large display 111. The set-top box 103 includes an arbitrating terminal determining unit 112, a display instruction receiving unit 113, and a first display control unit 114.

The large display 111 is, for example, a liquid crystal display, a plasma display, or an organic EL display, and is a display unit of a stationary television, for instance.

The arbitrating terminal determining unit 112 determines one of the mobile terminals 104 to 106 as an arbitrating terminal. In Embodiment 1, the arbitrating terminal determining unit 112 determines a first mobile terminal 104 as the arbitrating terminal. The specific method by which the arbitrating terminal determining unit 112 determines the arbitrating terminal is described later.

The display instruction receiving unit 113 receives a first instruction issued by a display instructing unit 122 (described later) of the mobile terminals 104 to 106.

The first display control unit 114 displays on the large display 111 an image based on the instruction issued by the display instructing unit 122 of the mobile terminals 104 to 106. The first display control unit 114 also displays on the large display 111 of the large display apparatus 101 an indication of the first instruction received by the display instruction receiving unit 113.

Although Embodiment 1 describes that the large display apparatus 101 includes the large flat-screen television 102 and the set-top box 103, the large display apparatus 101 is not limited to this configuration. The large display apparatus 101 may be configured in such a manner that the function of the large flat-screen television 102 and the function of the set-top box 103 are integrally provided. That is to say, the large display apparatus 101 may be configured of a single device or a combination of plural devices as long as the large display 111, the arbitrating terminal determining unit 112, the display instruction receiving unit 113, and the first display control unit 114 are included. Although the large display apparatus 101 includes the display instruction receiving unit 113, the display instruction receiving unit 113 may be omitted because it is not an essential structural element.

Each of the mobile terminals 104 to 106 includes a memory unit 121 or 131, a display instructing unit 122 or 132, an input receiving unit 123 or 133, a second display control unit 124 or 134, and a small display 125 or 135, and is a mobile terminal usually small enough for the user to hold with one hand.

The memory units 121 and 131 each store one or more pieces of image data. The memory units 121 and 131 are, for example, built-in flash memories capable of accumulating image data.

The display instructing unit 122 (132) issues the first instruction to the large display apparatus 101 to display on the large display apparatus 101 an image indicated by a piece of image data selected by the user, based on an input received by the input receiving unit 123 (133). Furthermore, the display instructing unit 122 of the first mobile terminal 104 determined as the arbitrating terminal by the arbitrating terminal determining unit 112 from among the mobile terminals 104 to 106 receives first instructions issued by the display instructing units 122 and 132 of the mobile terminals 104 to 106. The display instructing unit 122 then determines whether or not to cause the first display control unit 114 to display images indicated by the received first instructions, and issues a second instruction to the large display apparatus 101 to cause the first display control unit 114 to display an image according to the result of the determination.

The input receiving units 123 and 133 each receive a predetermined input for displaying on the large display apparatus 101 an image indicated by a piece of image data selected by the user from among one or more pieces of image data.

The second display control units 124 and 134 control content displayed on the small displays 125 and 135, respectively. For example, the second display control units 124 and 134 respectively display on the small displays 125 and 135 an image indicated by the image data stored in the memory units 121 and 131. When the display instructing unit 122 of the mobile terminal 104 determined as the arbitrating terminal receives the first instructions from the display instructing units 122 and 123 of the mobile terminals 104 to 106, the second display control unit 124 of the mobile terminal 104 determined as the arbitrating terminal displays on the small display 125 of the mobile terminal 104 determined as the arbitrating terminal an indication that the first instructions have been received.

Each of the small displays 125 and 135, together with a corresponding one of the input receiving units 123 and 133, constitutes a touch display.

Using a wireless LAN signal, the wireless LAN station 107 connects the mobile terminals 104 to 106 and the large display apparatus 101 to a network according to an Internet protocol. However, the configuration for connecting the mobile terminals 104 to 106 and the large display apparatus 101 to the network is not limited to this, and the large display apparatus 101 and the wireless LAN station 107 may be integrally provided as a single appliance.

The wireless LAN station 107 generally performs an operation for limiting the appliances connectible to the network via the wireless LAN station 107. This is to prevent unauthorized use of the Internet resources by outsiders. There are two methods for limiting the appliances connectible to the network via the wireless LAN station 107. One method is to use a password, and the other is to verify MAC addresses.

The method of using a password is to set a predetermined password to the wireless LAN station 107 and reject connection of an appliance to the network via the wireless LAN station 107 unless the appliance has the same password. The method of verifying MAC addresses is to store in the wireless LAN station 107 the MAC addresses of appliances permitted to connect to the network among the MAC addresses uniquely set to all appliances, and permit connection of the appliances whose MAC addresses are stored in the wireless LAN station 107 and reject connection of the appliances whose MAC addresses are not stored in the wireless LAN station 107.

Here, the first mobile terminal 104 is a mobile terminal of a user A who is the owner of the large display apparatus 101. It is assumed here that the first mobile terminal 104 shares a password with the wireless LAN station 107 and is thus in a connectible status. Hereinafter, the network via the wireless LAN station 107 is referred to as "the network of the user A". The above-mentioned connectible status is hereinafter expressed as "being connected to the network of the user A". Now assume that users B and C who are friends of the user A have brought with them a second mobile terminal 105 and a third mobile terminal 106, respectively. At this point, the second mobile terminal 105 and the third mobile terminal 106 have not yet shared a password with the wireless LAN station 107, and thus cannot connect to the network of the user A.

To connect the second mobile terminal 105 and the third mobile terminal 106 to the network of the user A, a password needs to be set to each of the second mobile terminal 105 and the third mobile terminal 106. However, since passwords are generally complicated, the setting is troublesome. One way of saving the trouble is to temporarily connect the first mobile terminal 104 and the second mobile terminal 105 using proximity communication through wireless connection such as infrared connection or Bluetooth (registered trademark) or wired connection via a USB cable, to transmit password information from the first mobile terminal 104 to the second mobile terminal 105. The above-mentioned proximity communication requires bringing the mobile terminals close to each other, thus making it less possible for outsiders to steal the password. The above-mentioned transmission of the password using the proximity connection may be performed with the large display apparatus 101 instead of the first mobile terminal 104.

The password transmitted from the first mobile terminal 104 to the second mobile terminal 105 or the third mobile terminal 106 need not be a password daily used by the first mobile terminal 104, and may be a guest password, for example. The wireless LAN station 107 may have such specifications that allow mobile terminals of guests different from the user A, such as the second mobile terminal 105 and the third mobile terminal 106, to set the connection to the wireless LAN station 107 in such a manner that the guest password becomes invalid after a short period of time (e.g., one day). This way, it is possible to further reduce the possibility of unauthorized use of the network of the user A. In this case, by simplifying the guest password instead of reducing the term of validity of the guest password, it is possible to save the trouble of entering the password, without the use of the above-described proximity communication. For example, the normal password set to the first mobile terminal 104 has 16 digits, whereas the guest password has 4 digits and thus can be easily entered, although the term of validity of the guest password is one hour and the network connection using the guest password is permitted only for one hour. As in this case, the number of digits of the guest password may be reduced as the term of validity of the guest password is reduced.

Although setting of a password has been described above as a method of permitting the connection to the network of the user A, the wireless LAN station 107 may permit the connection using MAC addresses by obtaining the MAC addresses of the second mobile terminal 105 and the third mobile terminal 106 using proximity communication.

Figure 3:
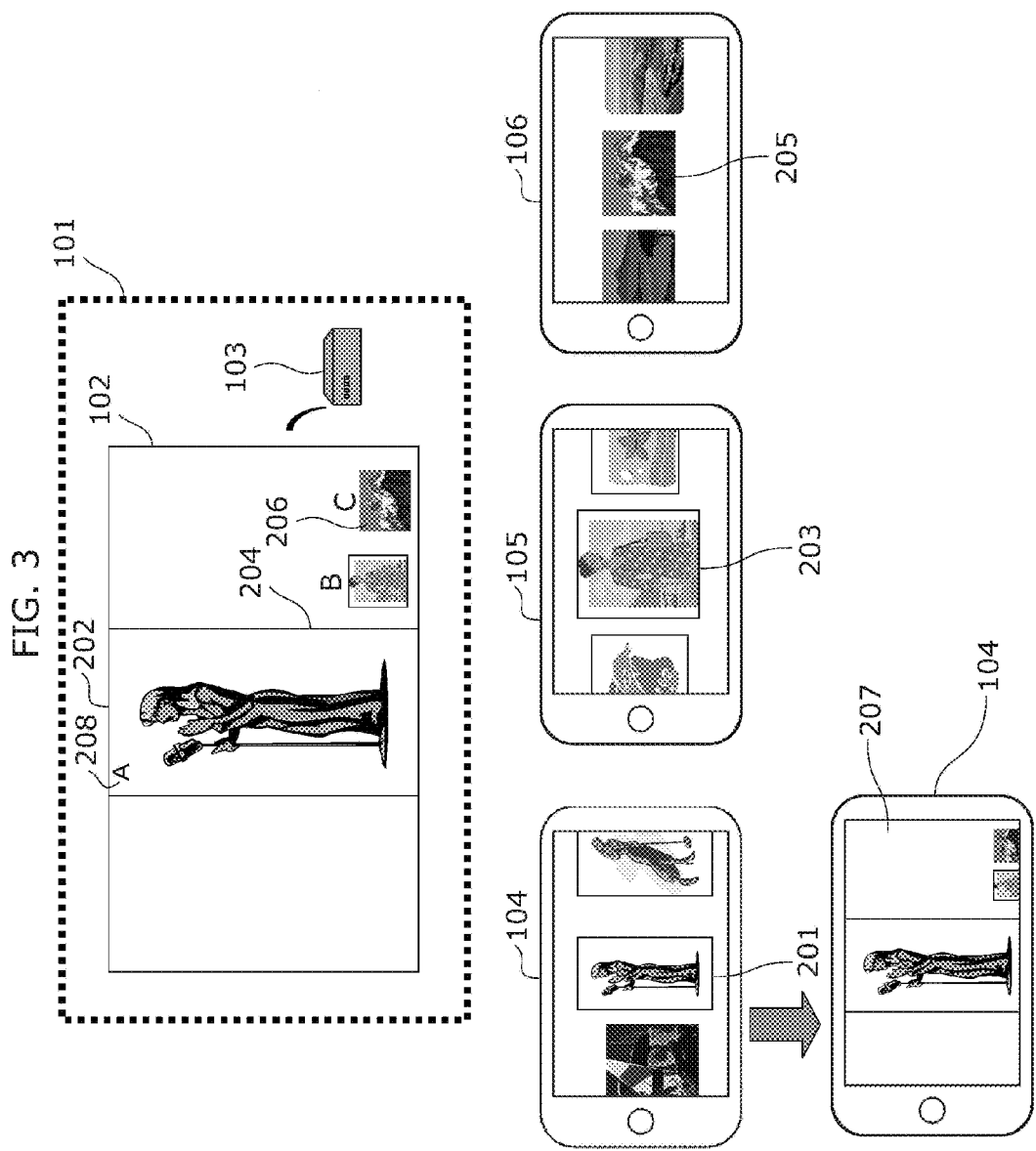
FIG. 3 shows a method of viewing of image data using a large display apparatus, by mobile terminals connected via a network in the configuration shown in FIG. 1.

FIG. 3 shows a method of viewing of image data using a large display apparatus, by the mobile terminals connected via the network in the configuration shown in FIG. 1.

It is assumed that an application is activated in each of the first mobile terminal 104, the second mobile terminal 105, and the third mobile terminal 106 for viewing the image data stored in the memory units 121 and 131 which are memories built in the respective mobile terminals. It is also assumed that each of the first mobile terminal 104, the second mobile terminal 105, and the third mobile terminal 106 is connected to the network via the wireless LAN station 107.

Figure 4:
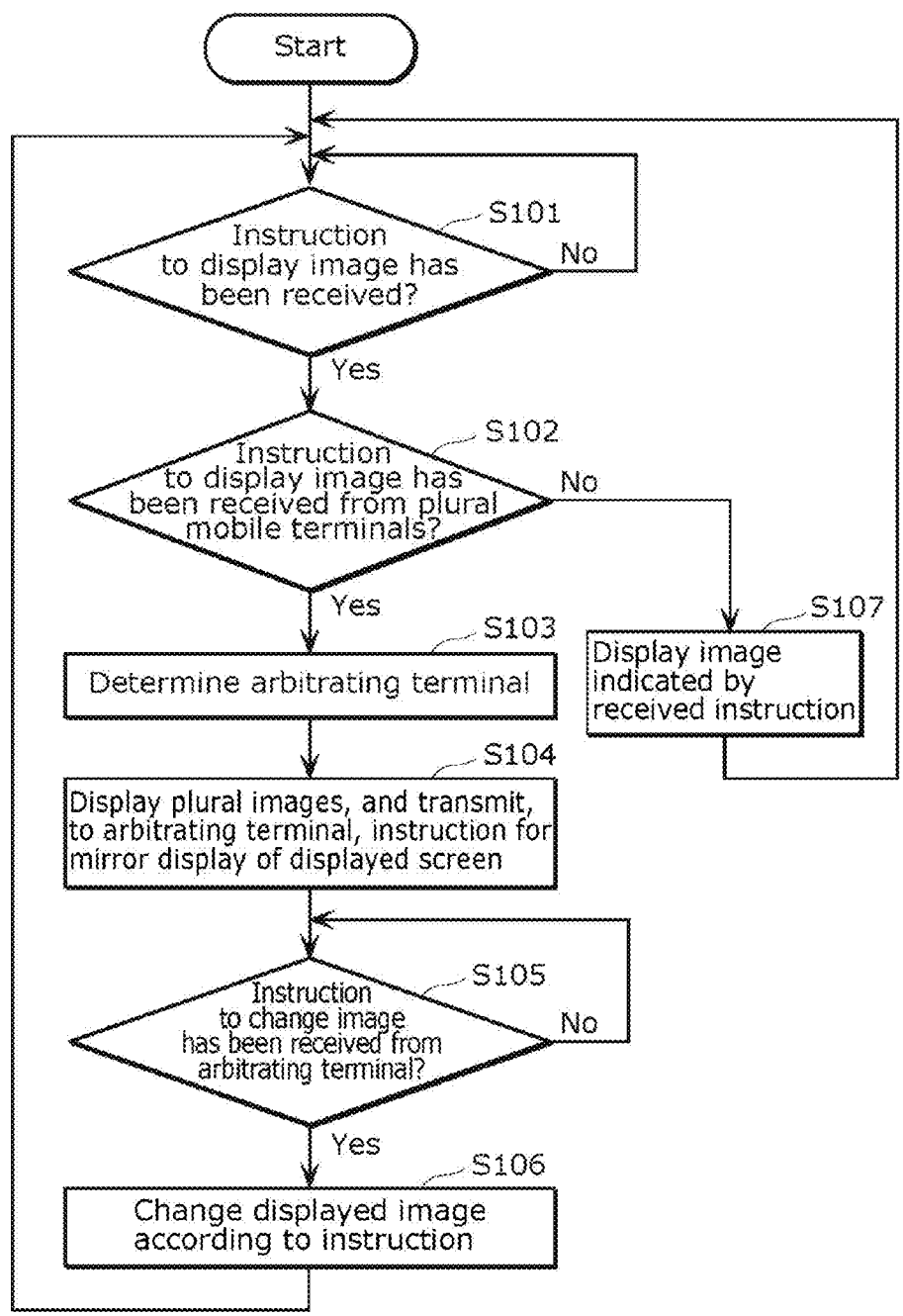
FIG. 4 is a flowchart showing processing of an image viewing method performed by a large display apparatus.

FIG. 4 is a flowchart showing the processing of the image viewing method performed by the large display apparatus 101.

First, the large display apparatus 101 determines whether or not the display instruction receiving unit 113 has received the first instruction to display an image from any of the display instructing units 122 and 132 of the mobile terminals 104 to 106 (S101). When the display instruction receiving unit 113 has not received the first instruction (No in S101), the processing returns to Step S101.

When the display instruction receiving unit 113 has received the first instruction (Yes in S101), the large display apparatus 101 determines whether or not the display instruction receiving unit 113 has received the first instruction to display an image from plural mobile terminals (S102).

When it is determined that the display instruction receiving unit 113 has received the first instruction from plural mobile terminals (Yes in S102), the arbitrating terminal determining unit 112 determines, as an arbitrating terminal, the first mobile terminal 104 of the user A whose connection status with the network satisfies a predetermined condition, from the first mobile terminal 104, the second mobile terminal 105, and the third mobile terminal 106 (S103). The connection status with the network mentioned here is the type of password entered for the connection to the network. To be more specific, the arbitrating terminal determining unit 112 determines that the predetermined condition is satisfied when, for example, the first mobile terminal 104 is connected to the network through entry of an owner password. The arbitrating terminal determining unit 112 determines that the first mobile terminal 104 satisfying the predetermined condition is the terminal of the owner of the network via the wireless LAN station 107. Other than such a determination method, the connection status with the network may be the number of times connection is made to the network or the order in which the mobile terminal is connected to the network. More specifically, the arbitrating terminal determining unit 112 may determine that a mobile terminal which is connected to the network a large number of times is the mobile terminal satisfying the predetermined condition, and determine that mobile terminal as the arbitrating terminal. The arbitrating terminal determining unit 112 may also determine that a mobile terminal whose initial connection to the network was made at the earliest time among the plural mobile terminals is the mobile terminal satisfying the predetermined condition, and determine that mobile terminal as the arbitrating terminal.

On the other hand, when it is determined that the display instruction receiving unit 113 has not received the first instruction from plural mobile terminals (No in S102), the first display control unit 114 displays an image indicated by the received first instruction (S107). For example, the user A who is the owner of the first mobile terminal 104 enters, into the input receiving unit 123 which is a touch display, an input indicating that the user A is selecting favorite image data 201. The first mobile terminal 104 which has received the input from the user A issues the first instruction to the large display apparatus 101 based on the input, to display on the large display apparatus 101 an image 202 indicated by the image data 201 selected by the user A. In this case, the first instruction is received only from the first mobile terminal 104, and thus the first display control unit 114 displays the image 202 indicated by the first instruction on the large display apparatus 101.

Following Step S103, the first display control unit 114 displays plural images on the large display 111 based on the first instructions received by the display instruction receiving unit 113, and transmits, to the first mobile terminal 104 determined as the arbitrating terminal, a mirror display instruction for mirror display of the displayed screen (S104). More specifically, when the display instruction receiving unit 113 has received the first instructions from the display instructing units 122 and 132 of the mobile terminals 104 to 106, the first display control unit 114 displays, as the image 202, the image data 201 indicated by the first instruction received earliest from the first mobile terminal 104, in a large size on the large display 111 as shown in FIG. 3, for example. It is to be noted that the first display control unit 114 displays an index 208 indicating that the image 202 is an image indicated by the image data 201 of the first mobile terminal 104. The index 208 is displayed in such a manner that it is superimposed on the image 202. The first display control unit 114 then displays, in a region of the large display 111 other than the region in which the image 202 is displayed, image data 203 indicated by the first instruction received secondly or thirdly from the second mobile terminal 105 and image data 205 indicated by the first instruction received secondly or thirdly from the third mobile terminal 106, as icons 204 and 206, respectively, which indicate that the first instructions have been received from the second mobile terminal 105 and the third mobile terminal 106. More specifically, the first display control unit 114 displays on the large display 111a first image (image 202) based on the first instruction received from the first mobile terminal 104 which is the arbitrating terminal, and displays on the large display 111 second images (icons 204 and 206) based on the first instructions received from the mobile terminals 105 and 106 different from the arbitrating terminal, in a second size smaller than a first size in which the first image (image 202) is displayed.

This is the case where the user B, who is the owner of the second mobile terminal 105, selects favorite image data 203 and instructs display of the image data 203 on the large display apparatus 101, for example. More specifically, the second mobile terminal 105 instructs the large display apparatus 101 to display on the large display apparatus 101 the image data 203 selected through the first instruction indicated by the input made by the user B. Unlike the previous case, the image 202 is already displayed on the large display apparatus 101. Thus, the first display control unit 114 does not display an image indicated by the image data 203 over the currently-displayed image 202, but displays, in a region of the large display apparatus 101 other than the region in which the image 202 is displayed, the icon 204 indicating that the instruction to display the image data 203 stored in the second mobile terminal 105 has been received. Similarly, when the first instruction to display the image data 205 stored in the third mobile terminal 106 has been received by the large display apparatus 101, the icon 206 indicating that the instruction to display the image data 205 stored in the third mobile terminal 106 has been received by the large display apparatus 101 is displayed in a region of the large display apparatus 101 other than the regions in which the image 202 and the icon 204 are displayed.

It is to be noted that the first display control unit 114 need not display the icons 204 and 206 in a region other than the region in which the image 202 is displayed, and may superimpose the icons 204 and 206 on the image 202. In this case, the first display control unit 114 may display the icons 204 and 206 in a region of the image 202 other than the center of the image 202, or may detect the position of the object of the image 202 and display the icons 204 and 206 in a region other than the position of the object. The object of the image may be detected using an image processing technique such as face recognition, or may be detected using image sharpness. In the case of using image sharpness, the object is determined to be present in a region with high sharpness.

The display instruction receiving unit 113 checks whether or not the second instruction to change the displayed image has been received from the first mobile terminal 104 which is the arbitrating terminal (S105). When the instruction to change the displayed image has not been received from the first mobile terminal 104 (No in S105), the processing returns to S105.

On the other hand, when the second instruction to change the displayed image has been received from the first mobile terminal 104 (Yes in S105), the displayed image is changed according to the second instruction (S106). Specific display control is described in the following description of the processing flow of the mobile terminals.

Figure 5:
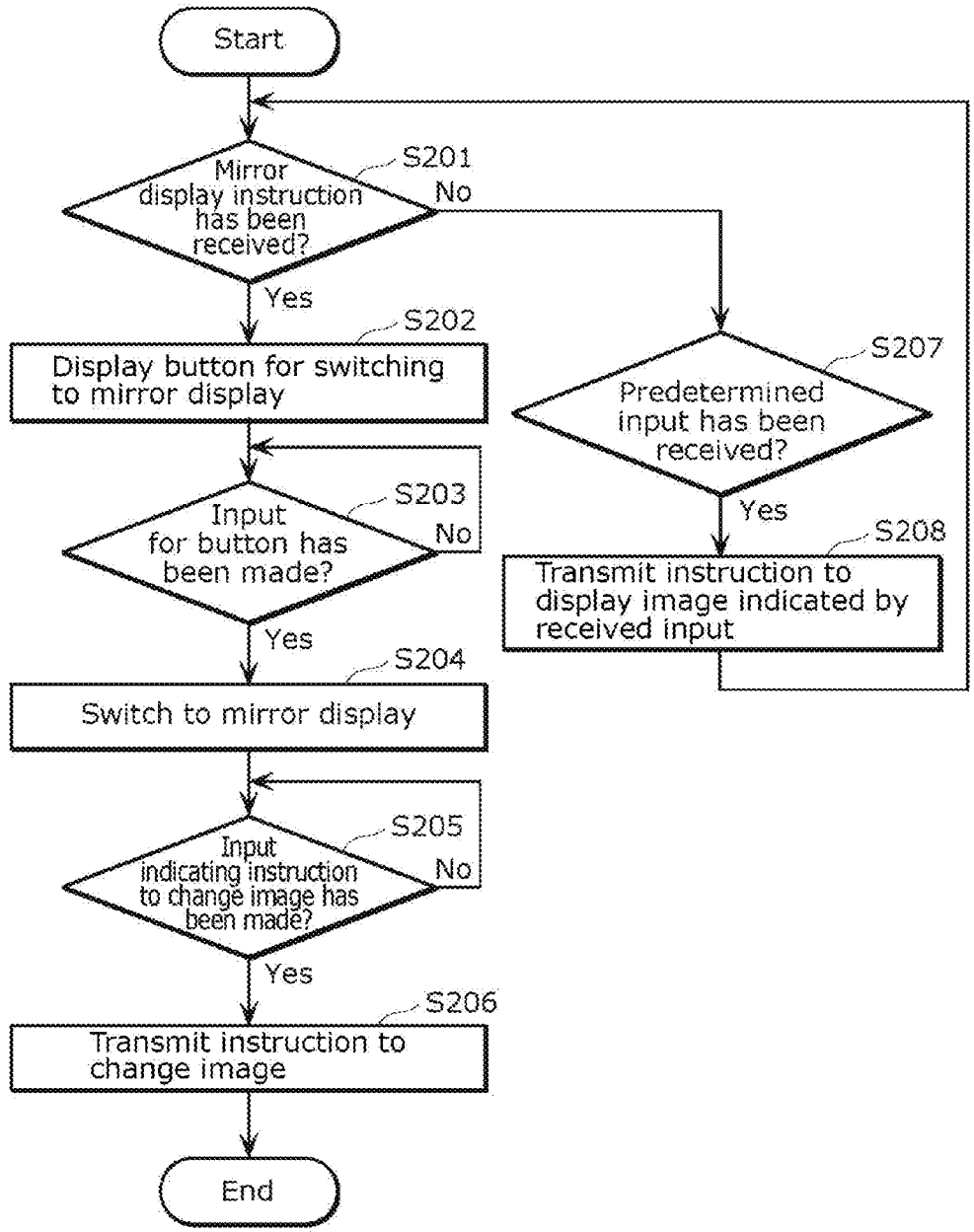
FIG. 5 is a flowchart showing processing of an image viewing method performed by each of mobile terminals 104 to 106.

FIG. 5 is a flowchart showing the processing of the image viewing method performed by each of the mobile terminals 104 to 106.

First, it is determined whether or not the mirror display instruction has been received from the large display apparatus 101 (S201). When the mirror display instruction has not been received from the large display apparatus 101 (No in S201), the processing proceeds to Step S207. What is determined in Step S201 is whether or not the first instruction has been issued to the large display apparatus 101 from the plural mobile terminals 104 to 106. That is to say, since the mirror display instruction is issued only to the arbitrating terminal, the determination in Step S201 causes the processing subsequent to Step S201 to branch to processing performed by the arbitrating terminal and processing performed by the other mobile terminals.

When the mirror display instruction has been received from the large display apparatus 101 (Yes in S201), the mobile terminal which has received the mirror display instruction displays a button for switching to mirror display (S202). Specifically, as described using FIG. 1, the first mobile terminal 104 is already connected to the network of the user A and is thus automatically determined as the arbitrating terminal. When the icons 204 and 206 are displayed indicating that instructions to display images have been received (S104), a button for switching to a mode in which the second display control unit 124 controls the display on the large display apparatus 101 is displayed on the small display 125 of only the first mobile terminal 104 which is the arbitrating terminal.

Then, the input receiving unit 123 of the first mobile terminal 104 determines whether or not an input for the button has been made (S203). Here, when the user touches (makes an input for) the button (Yes in S203), an image 207 displayed in a predetermined region of the large display 111 of the large display apparatus 101 (in the present embodiment, the predetermined region is the entire display region of the large display apparatus 101) is mirror-displayed on the small display 125 of the first mobile terminal 104 (S204). In other words, the second display control unit 124 changes the image displayed on the small display 125 to mirror-display the image displayed on the large display 111 of the large display apparatus 101. Here, the image displayed on the large display 111 is mirror-displayed on the small display 125 of the arbitrating terminal. However, the present disclosure is not limited to the mirror display as long as an indication, displayed on the large display 111, that the first instructions have been received from plural mobile terminals is displayed on the small display 125 of the arbitrating terminal. To be more specific, the second display control unit 124 need not display an image on the small display 125 of the arbitrating terminal, and may display text information indicating the first instructions received from plural mobile terminals.

Next, it is determined whether or not an input indicating an instruction to change the image has been made to the input receiving unit 123 of the first mobile terminal 104 (S205). When the icon 204 or the icon 206 displayed on the small display 125 of the first mobile terminal 104 is touched, it is determined that the input indicating an instruction to change the image has been made (Yes in S205), and the display instructing unit 122 transmits the instruction to change the image to the large display apparatus 101 (S206). That is to say, when the large display apparatus 101 receives the second instruction from the first mobile terminal 104 to change the displayed image (Yes in S105), the large display apparatus 101 displays the image indicated by the icon 204 or the icon 206 in a larger size, i.e., the first size instead of the second size, according to the second instruction (S106). In other words, when the second instruction is received from the arbitrating terminal, the first display control unit 114 of the large display apparatus 101 displays, on the large display 111 and in the first size larger than the second size, the second image (icon 204, 206) displayed in the second size on the large display 111, based on the second instruction. A double-touch of the image 202 and the icon 204 may bring about display of the two images next to each other in a large size.

As described above, when the plural mobile terminals 104 to 106 are brought in by their respective users and are easily connected to the network, and the users of the mobile terminals 104 to 106 find an image to show to others, the image viewing system 1 according to Embodiment 1 allows two or more people to view the image using the large display apparatus 101. At this time, the individual mobile terminals 104 to 106 can issue at any time the first instruction to display an image using the large display apparatus 101, without worrying about the other users. The mobile terminal 104 determined as the arbitrating terminal can acknowledge the first instructions issued by the mobile terminals 104 to 106 and select image data to be displayed next on the large display 111 in full-screen. This produces a particularly advantageous effect of allowing two or more people to smoothly view the image data stored in the mobile terminals 104 to 106.

It is to be noted that the present disclosure is not limited to the above-described configuration, and other configurations are also possible. In the above description, the first mobile terminal 104 of the user A, who is the original owner of the network, is determined as the arbitrating terminal. However, each of the mobile terminals 104 to 106 may display a button for switching to a mode of controlling the display on the large display apparatus 101, and a mobile terminal to which an input for the button has been made may be determined as the arbitrating terminal, for example. Another possible way of determining the arbitrating terminal is that the current arbitrating terminal determines the next arbitrating terminal. A further possible way is that one of the plural mobile terminals which is located most closely to the large display apparatus 101 is determined as the arbitrating terminal.

Furthermore, the image data which can be displayed on the large display may be a still picture or a moving picture depending on the image viewing system.

Embodiment 2

Figure 6:
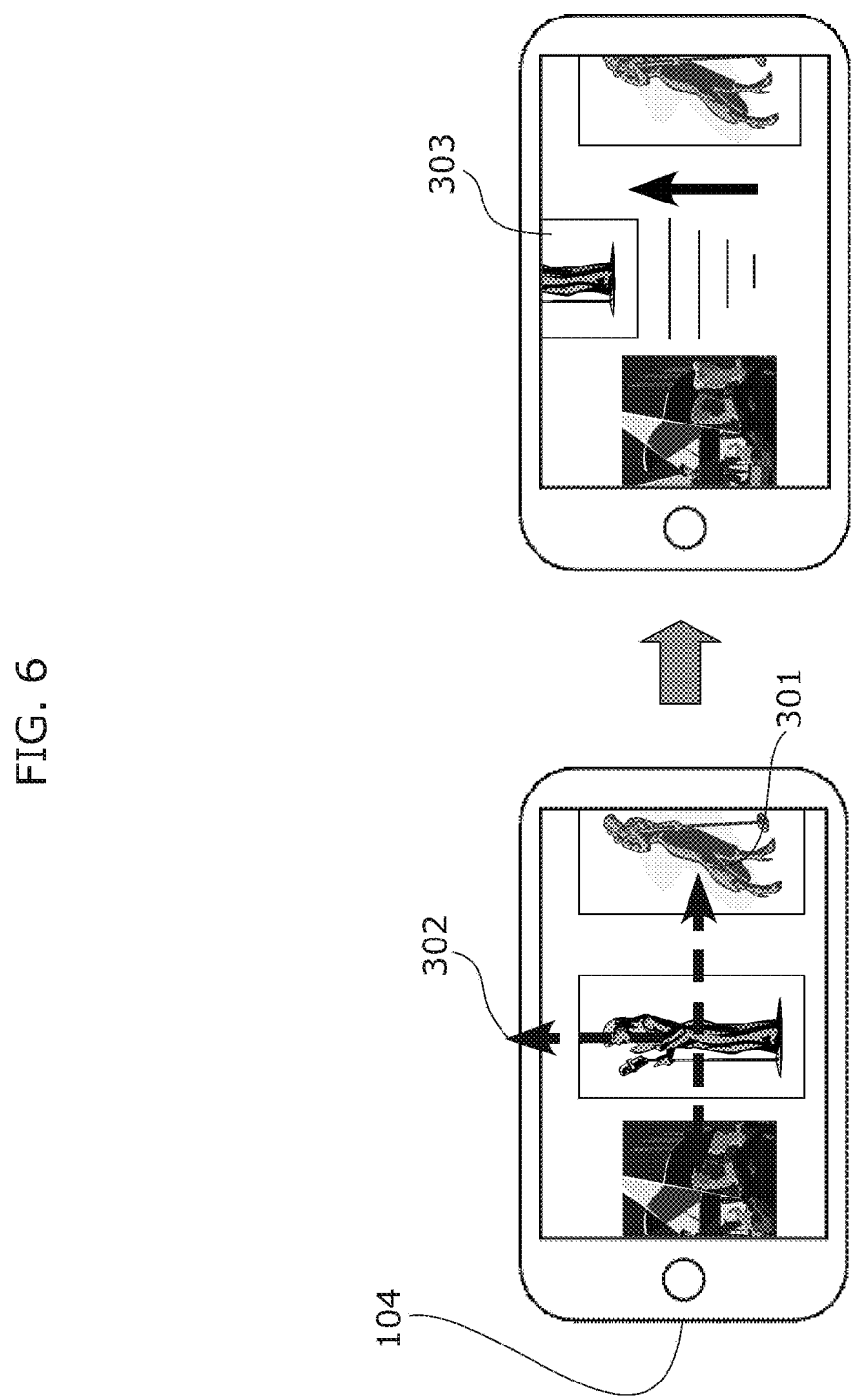
FIG. 6 shows a method of operating a mobile terminal in an image viewing system according to Embodiment 2.

FIG. 6 shows a method of operating a mobile terminal in an image viewing system 1 according to Embodiment 2. Embodiment 2 takes the first mobile terminal 104 as an example of the mobile terminal. It is to be noted that this operation method is the same regardless of whether the mobile terminal is the arbitrating terminal or not. In FIG. 6, an application is activated in the first mobile terminal 104 for selecting image data stored in the first mobile terminal 104 and viewing an image indicated by the selected image data. With the first mobile terminal 104, an image to be displayed can be selected by scrolling through the displayed images through a horizontal flick input (see the arrow 301). The functional configuration of the image viewing system 1 according to Embodiment 2 is the same as the configuration of the image viewing system 1 according to Embodiment 1 shown in FIG. 2. Thus, the detailed description is not repeated here.

Although no particular mention is made in Embodiment 1, the input receiving units 123 and 133 of the mobile terminals 104 to 106 each receive a gesture input as the predetermined input. Furthermore, the input receiving units 123 and 133 each receive a flick input as the gesture input.

When the input receiving units 123 and 133 receive a gesture input, the display instructing units 122 and 132 of the mobile terminals 104 to 106 issue, as the first instruction, an instruction to the large display apparatus 101 to display an image indicated by the image data for which the gesture input has been made. When the gesture input received by the input receiving units 123 and 133 is a drag of an image indicating image data for a first predetermined distance or longer, the display instructing units 122 and 132 issue, as the first instruction, an instruction to the large display apparatus 101 to display the image indicated by the image data for which the gesture input has been made.

To be more specific, when a flick input is made in the vertical direction (see the arrow 302) different from the direction of the scrolling performed for the image selection, it means that the first instruction is issued for displaying on the large display apparatus 101 the image indicated by the image data selected through the vertical flick. Here, the UI becomes more instinctive if the small display 125 of the first mobile terminal 104 displays animation as though the image is flying off in the direction of the flick input, like the image 303.

Figure 7:
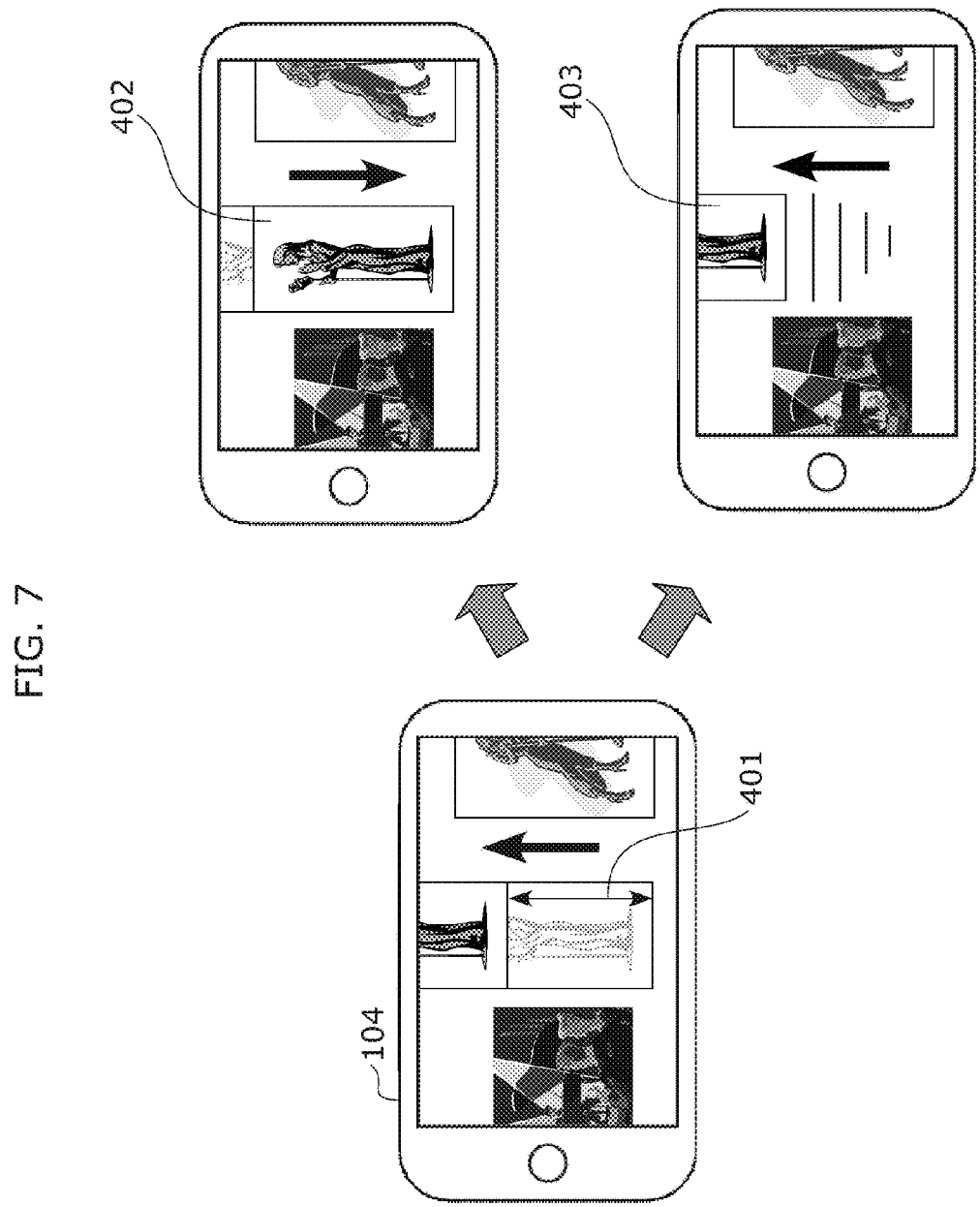
FIG. 7 shows that a flick input shown in FIG. 6, which is a gesture input indicating a first instruction to display an image on a large display apparatus, is performed through a drag on a first mobile terminal.

FIG. 7 shows that the flick input shown in FIG. 6, which is a gesture input indicating the first instruction to display an image on the large display apparatus 101, is performed through a drag on the first mobile terminal 104. The input indicated by the drag is an operation of sliding the selected photo in the upper direction while holding down the photo with a finger. When the input receiving unit 123 detects that the user lifts the finger off the screen before a finger moving distance 401 of the input reaches the first predetermined distance, the second display control unit 124 displays on the small display 125 the image moving back to its original position, like the image 402. When the input receiving unit 123 detects that the finger moving distance 401 has reached the first predetermined distance, the second display control unit 124 displays on the small display 125 the animation of the image flying off, like the image 403, and the display instructing unit 122 of the first mobile terminal 104 to which this operation has been performed issues the first instruction to the large display apparatus 101 to display the image 403. When the input is made through a drag, the image may be displayed with a shorter moving distance when the finger moving distance 401 is longer, instead of displaying the image in such a manner that the movement of the image always matches the movement of the finger. This way, it becomes more effective in providing the user with a feeling as though the image is connected to a spring and preventing unintentional display on the large display apparatus 101. It becomes more effective if the movement of the image returning to its original position, like the image 402, involves acceleration and vibration as though the image is returning by the force exerted by the spring. It also becomes more effective if the movement of the image flying off to the large display apparatus 101, like the image 403, involves acceleration as though the image is released from a fully-stretched spring and is thus pulled in the direction opposite to the spring.

When the finger moving distance 401 of the drag of the selected image has reached the first predetermined distance, the display instructing unit 122 issues the first instruction to the large display apparatus 101; however, the finger moving distance 401 of the drag need not be the threshold. The condition for the input under which the first instruction is issued to the large display apparatus 101 may be, for example: the drag speed reaching a predetermined speed; the number of fingers used for the drag or flick being two; or the contact area of the touching finger being greater than a predetermined area or less than a predetermined area even when the number of the touching fingers is one. Moreover, the threshold of the finger moving distance 401 may be decreased when the drag speed increases, and the determination may be made using the resulting threshold. In this case, for example, when the drag speed is greater than a predetermined speed, the display instructing unit 122 issues the first instruction to the large display apparatus 101 if the finger moving distance 401 has not reached the first predetermined distance but has reached a second predetermined distance shorter than the first predetermined distance, whereas when the drag speed is not greater than the predetermined speed, the display instructing unit 122 does not issue the first instruction to the large display apparatus 101 unless the finger moving distance 401 is greater than the first predetermined distance.

Embodiment 3

Figure 8:
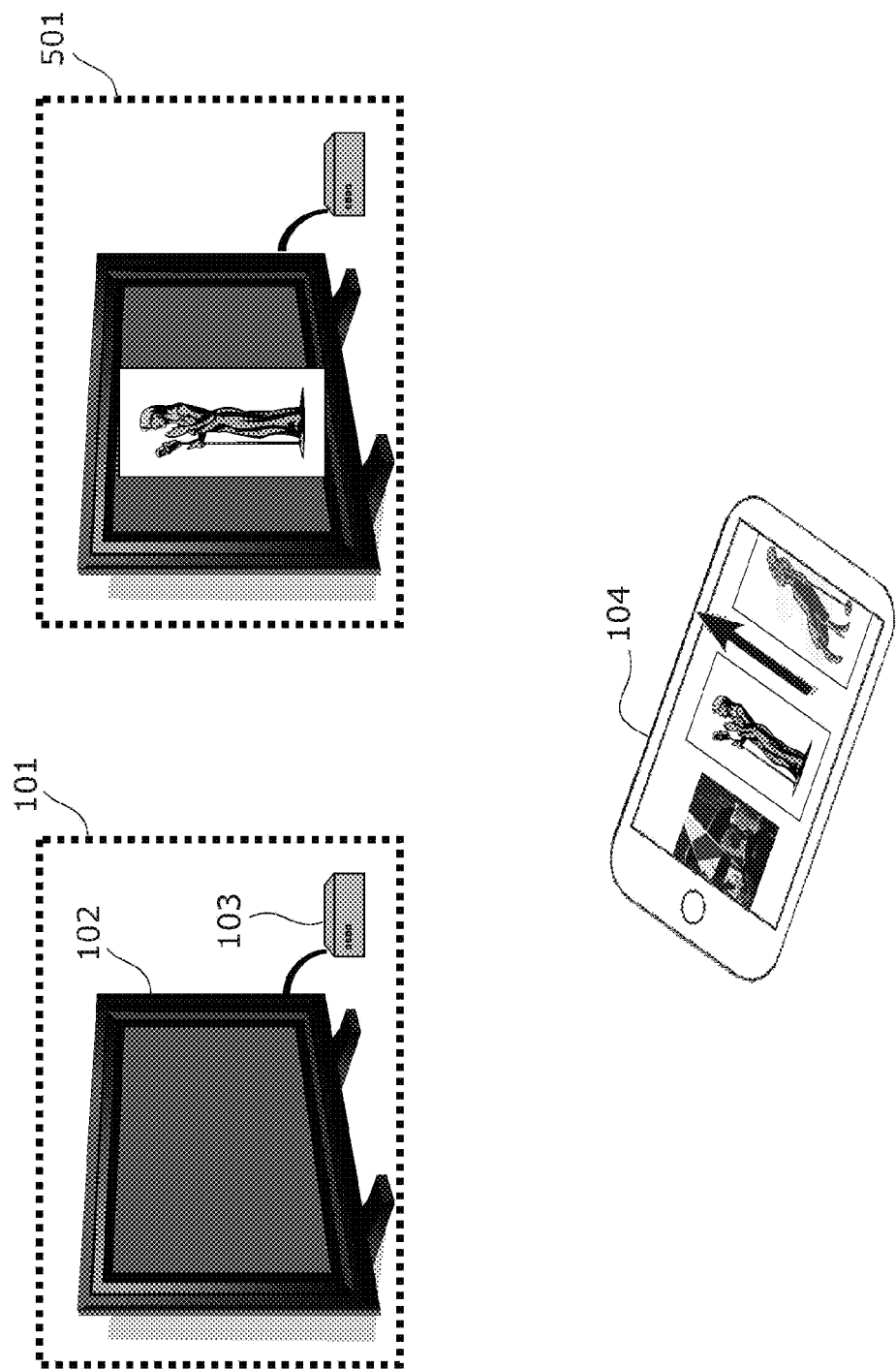
FIG. 8 shows a method of operating a mobile terminal in an image viewing system according to Embodiment 3.
Figure 9:
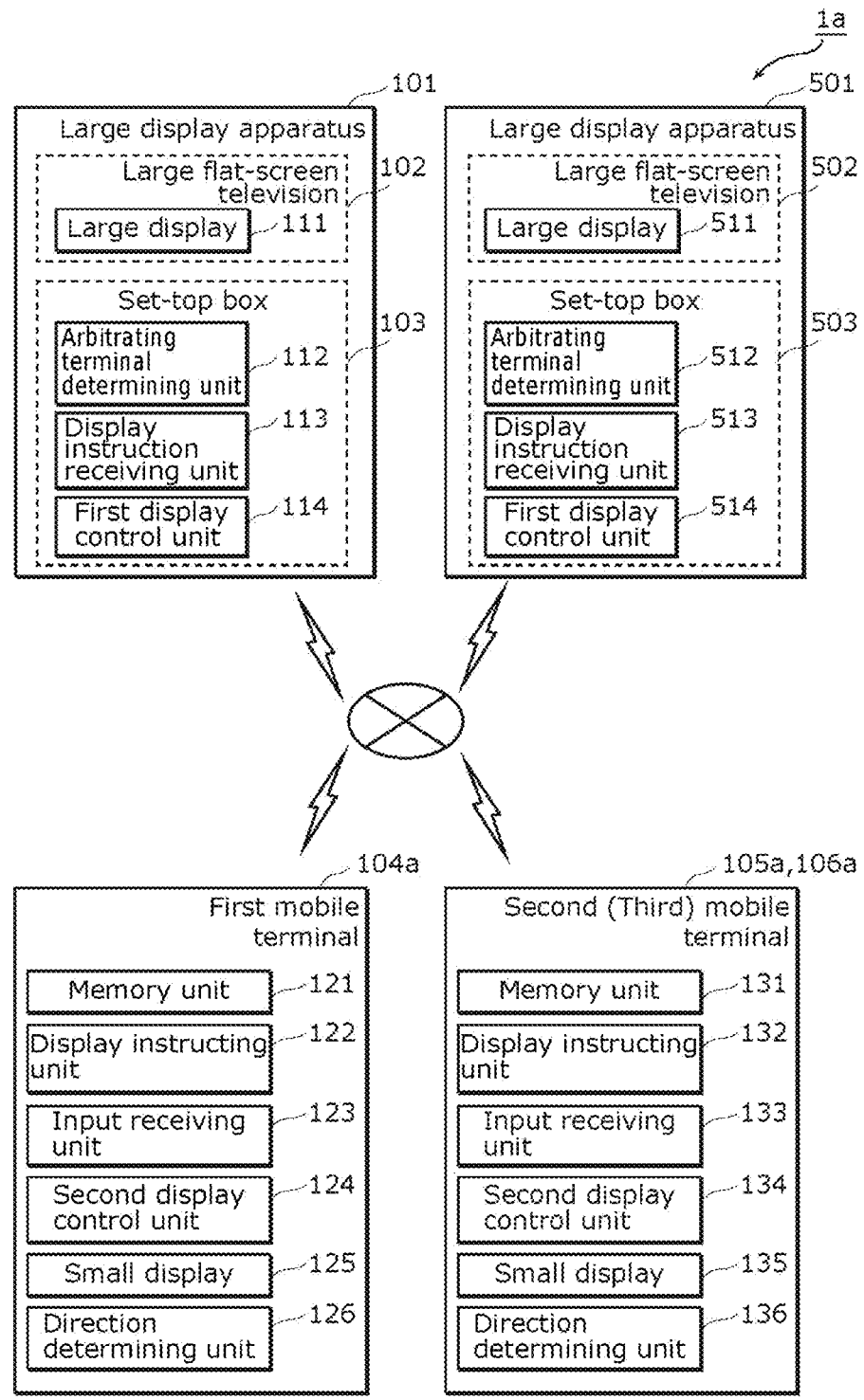
FIG. 9 is a functional block diagram of an image viewing system according to Embodiment 3.

FIG. 8 shows a method of operating a mobile terminal in an image viewing system is according to Embodiment 3. FIG. 9 is a functional block diagram of the image viewing system according to Embodiment 3. Embodiment 3 takes a first mobile terminal 104a as an example of the mobile terminal. It is to be noted that this operation method is the same regardless of whether the mobile terminal is the arbitrating terminal or not. The image viewing system 1a of Embodiment 3 is different from the image viewing system 1 of Embodiment 1 and Embodiment 2 in that the image viewing system is of Embodiment 3 includes two large display apparatuses 101 and 501. Mobile terminals 104a to 106a of Embodiment 3 are different from the mobile terminals 104 to 106 of Embodiment 1 in that the mobile terminal 104a includes a direction determining unit 126 and the mobile terminals 105a and 106a each include a direction determining unit 136. The other structural elements are the same as those of the image viewing system 1 of Embodiment 1 and Embodiment 2, and thus their descriptions are not repeated. The structural elements common to the image viewing system 1 of Embodiment 1 and Embodiment 2 are denoted with the same reference numerals. The large display apparatus 501 has the same configuration as the large display apparatus 101 except that the structural elements of the large display apparatus 501 have reference numerals in the 500s instead of the 100s. Thus, the description of each structural element is not repeated.

The following describes the structural elements and functions different from the image viewing system 1 of Embodiment 1 and Embodiment 2.

The direction determining unit 126 (136) determines to which of the large display apparatus 101 and the large display apparatus 501 the flick input received by the input receiving unit 123 is directed from the mobile terminal 104a (105a, 106a).

When the direction determining unit 126 (136) identifies the large display apparatus (the large display apparatus 101 or the large display apparatus 501) located in the direction of the flick input, the display instructing unit 122 (132) issues, as the first instruction, an instruction to display an image indicated by the image data for which the flick input has been made, to the large display apparatus determined to be located in the direction of the flick input.

To instinctively determine to which of the large display apparatus 101 and the large display apparatus 501 the instruction to display the image is to be issued, Embodiment 3 describes processing performed when the flick is made with the first mobile terminal 104 facing the large display apparatus 501 on which the image is to be displayed.

There are various methods for determining which of the large display apparatus 101 and the large display apparatus 501 the first mobile terminal 104 is facing. Specifically, the direction determining unit 126 (136) uses the following methods to determine which of the large display apparatus 101 and the large display apparatus 501 the first mobile terminal 104 is facing.

An example is a method of outputting a characteristic sound from a speaker of each of the large display apparatuses 101 and 501 and collecting the characteristic sound using a microphone of the first mobile terminal 104, for determining which direction the first mobile terminal 104 is facing. In this case, it becomes more effective if the sound to be output is ultrasound unperceivable by human ears and has a frequency uniquely determined for each of the large display apparatuses 101 and 501. In this case, it is determined that the first mobile terminal 104 is facing one of the large display apparatuses 101 and 501 which is outputting a sound determined to be higher in sound level when collected.

Similarly, the direction may be determined using a method in which each of the large display apparatuses 101 and 501 outputs an infrared ray having a uniquely determined frequency, and the first mobile terminal 104 obtains the infrared ray using an infrared sensor. In this case, it is determined that the first mobile terminal 104 is facing one of the large display apparatuses 101 and 501 which is outputting an infrared ray determined to be higher in infrared gain when obtained.

It is also possible to use a method of estimating the direction the first mobile terminal 104 is facing, using a geomagnetic sensor included in the first mobile terminal 104.

Although the above-described embodiment includes two large display apparatuses, there may be three or more large display apparatuses. Furthermore, there may be one large display apparatus. Even when there is one large display apparatus, receiving the display instruction after checking whether or not the first mobile terminal 104 is facing the large display apparatus produces a particularly advantageous effect of preventing unintentional display on the large display apparatus caused by an improper flick input.

Embodiment 4

FIG. 10 shows a method of operating a mobile terminal in an image viewing system according to Embodiment 4. Embodiment 4 takes the first mobile terminal 104 as an example of the mobile terminal. It is to be noted that this operation method is the same regardless of whether the mobile terminal is the arbitrating terminal or not. An image viewing system is according to Embodiment 4 includes two large display apparatuses 101 and 501. The functional configuration of the image viewing system 1a according to Embodiment 4 is the same as that of the image viewing system 1a according to Embodiment 3, and thus the detailed description is not repeated. To instinctively determine to which of the two large display apparatuses 101 and 501 the instruction to display an image is to be issued, Embodiment 4 describes an embodiment in which icons are displayed for selecting a large display apparatus on which the image is to be displayed.

In this case, when there are plural large display apparatuses such as the large display apparatuses 101 and 501, and the gesture input received by the input receiving unit 123 is a drag of an image indicating image data for a second predetermined distance shorter than a first predetermined distance, the second display control unit 124 displays on the small display 125 plural icons 601 and 602 which correspond to the large display apparatuses 101 and 501, respectively.

The display instructing unit 122 then issues, as the first instruction, an instruction to display the image indicating the image data, to the large display apparatus indicated by one of the icons 601 and 602 which corresponds to the end position of the drag.

For example, when the finger moving distance 401 is greater than or equal to the second predetermined distance shorter than the first predetermined distance, the second display control unit 124 displays on the small display 125 of the first mobile terminal 104 the icons 601 and 602 for selecting one of the large display apparatuses 101 and 501. The icon 601 indicates the large display apparatus 101, and the icon 602 indicates the large display apparatus 501. Here, the user slides an image with a finger toward the icon indicating the large display apparatus on which the user wishes to display the image (see the arrow 603). When the finger approaches the icon (icon 602 in this case) in this state, the display instructing unit 122 issues, as the first instruction, an instruction to display the image indicating the image data, to the large display apparatus 501 indicated by the icon 602, among the icons 601 and 602, which corresponds to the end position of the drag. The image is displayed on the selected large display apparatus (the large display apparatus 501 in the case of FIG. 10).

It is desirable that the icons 601 and 602 show information for identifying the large display apparatuses 101 and 501, respectively. An example of such information is the model or screen size (the number of inches) of the large flat-screen television included in the large display apparatus. The set-top box included in the large display apparatus obtains such information from the large flat-screen television through communication with the large flat-screen television using an HDMI cable. It is more favorable if the positional relationship between regions of the touch display of the small terminal A104 in which the icons 601 and 602 are displayed matches the actual positional relationship between the large display apparatuses 101 and 501. To do so, the small terminal A104 may obtain the positional relationship between the large display apparatuses 101 and 501 by receiving unique ultrasound or infrared ray emitted by each of the large display apparatuses 101 and 501 as described in Embodiment 3.

Although the above-described embodiment includes two large display apparatuses, there may be three or more large display apparatuses. Furthermore, there may be one large display apparatus. Even when there is one large display apparatus, dragging an image to the icon with a finger produces a particularly advantageous effect of preventing unintentional display on the large display apparatus caused by an improper drag.

Furthermore, the icons 601 and 602 may be used for designating a function, apart from being used for simply identifying the large display apparatuses 101 and 501. For example, when the first mobile terminal 104 issues the first instruction to the large display apparatus 101 to display two images next to each other instead of one image, two icons may be displayed so that each icon corresponds to one of two display regions of the large display apparatus 101 which are used for displaying two images next to each other.

Furthermore, the icons 601 and 602 may be displayed for designating mobile terminals other than the first mobile terminal 104 and connected to the same network, such as the second mobile terminal 105 and the third mobile terminal 106, apart from designating the large display apparatuses 101 and 501. For example, when the user drags an image to the icon indicating the second mobile terminal 105, the image data is not displayed on the large display apparatus but is transferred to the designated second mobile terminal 105. This configuration simplifies the sharing of the image data between plural mobile terminals.

Embodiment 5

Figure 11:
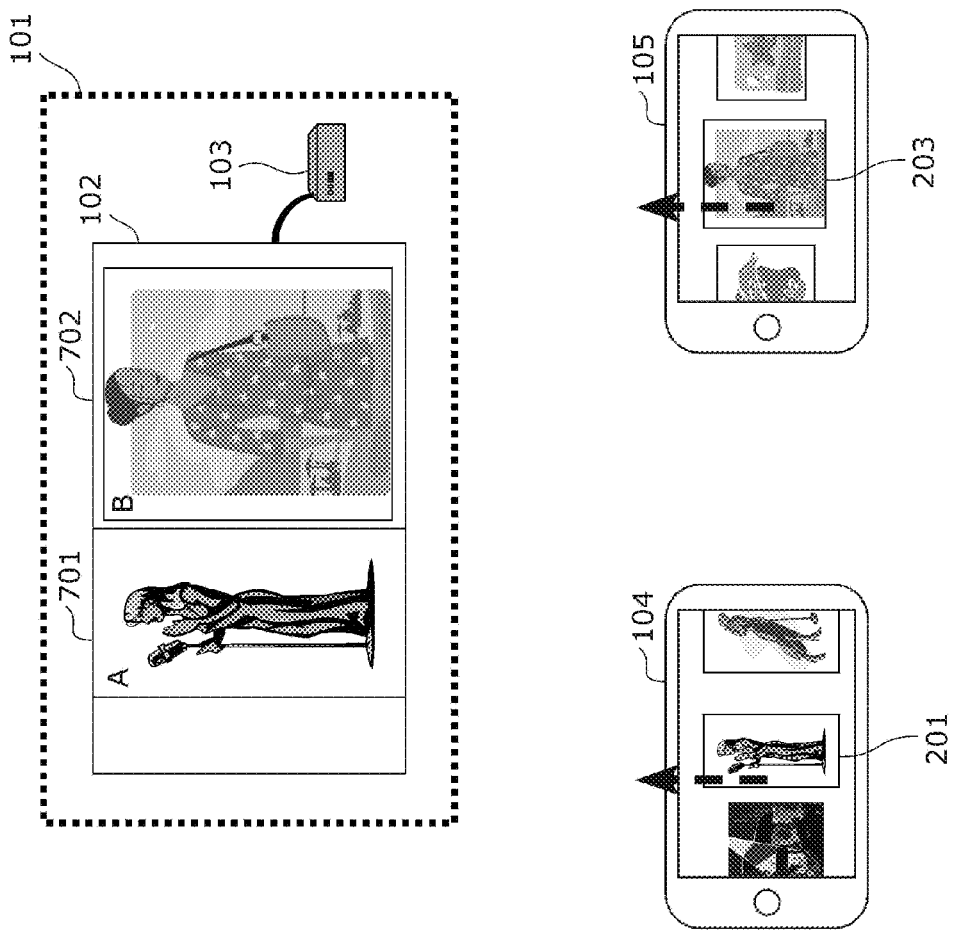
FIG. 11 shows a method of operating a small terminal in an image viewing system according to Embodiment 5.

FIG. 11 shows a method of operating a mobile terminal in an image viewing system 1 according to Embodiment 5. Embodiment 5 describes an embodiment in which plural pieces of image data stored in plural mobile terminals are displayed next to each other on the large display apparatus without an operation by the arbitrating terminal.

In FIG. 11, the first mobile terminal 104 selects the image data 201 to be displayed on the large display apparatus 101 and the second mobile terminal 105 selects the image data 203 to be displayed on the large display apparatus 101. Here, the following describes the processing performed when the user operating the first mobile terminal 104 and the user operating the second mobile terminal 105 simultaneously perform, by prearrangement, a flick operation to the first mobile terminal 104 on which the image data 201 is displayed and a flick operation to the second mobile terminal 105 on which the image data 203 is displayed, respectively.

It is to be noted that "simultaneously" mentioned here does not require a perfect match in time between the flick operations, and may allow a certain amount of difference in time that the users can consider as "simultaneous". To prevent a coincidental match in time, it would be more favorable if the "simultaneous" operation does not allow at least a certain amount of difference in time by which the user A operating the first mobile terminal 104 and the user B operating the second mobile terminal 105 can simultaneously perform the flick operations without a prearrangement.

As described above, when the flick inputs are made simultaneously to the input receiving unit 123 of the first mobile terminal 104 and the input receiving unit 133 of the second mobile terminal 105, the large display apparatus 101 may recognize that display instructions have been issued from the first mobile terminal 104 and the second mobile terminal 105 in the same time period, and display, next to each other, the images indicated by the image data for which the flick inputs have been made to the first mobile terminal 104 and the second mobile terminal 105, by increasing or decreasing the sizes of the respective images to a substantially equal size.

The present embodiment makes it possible to designate images to be displayed next to each other using a simpler method without a special operation by the arbitrating terminal.

Embodiment 6

Figure 12:
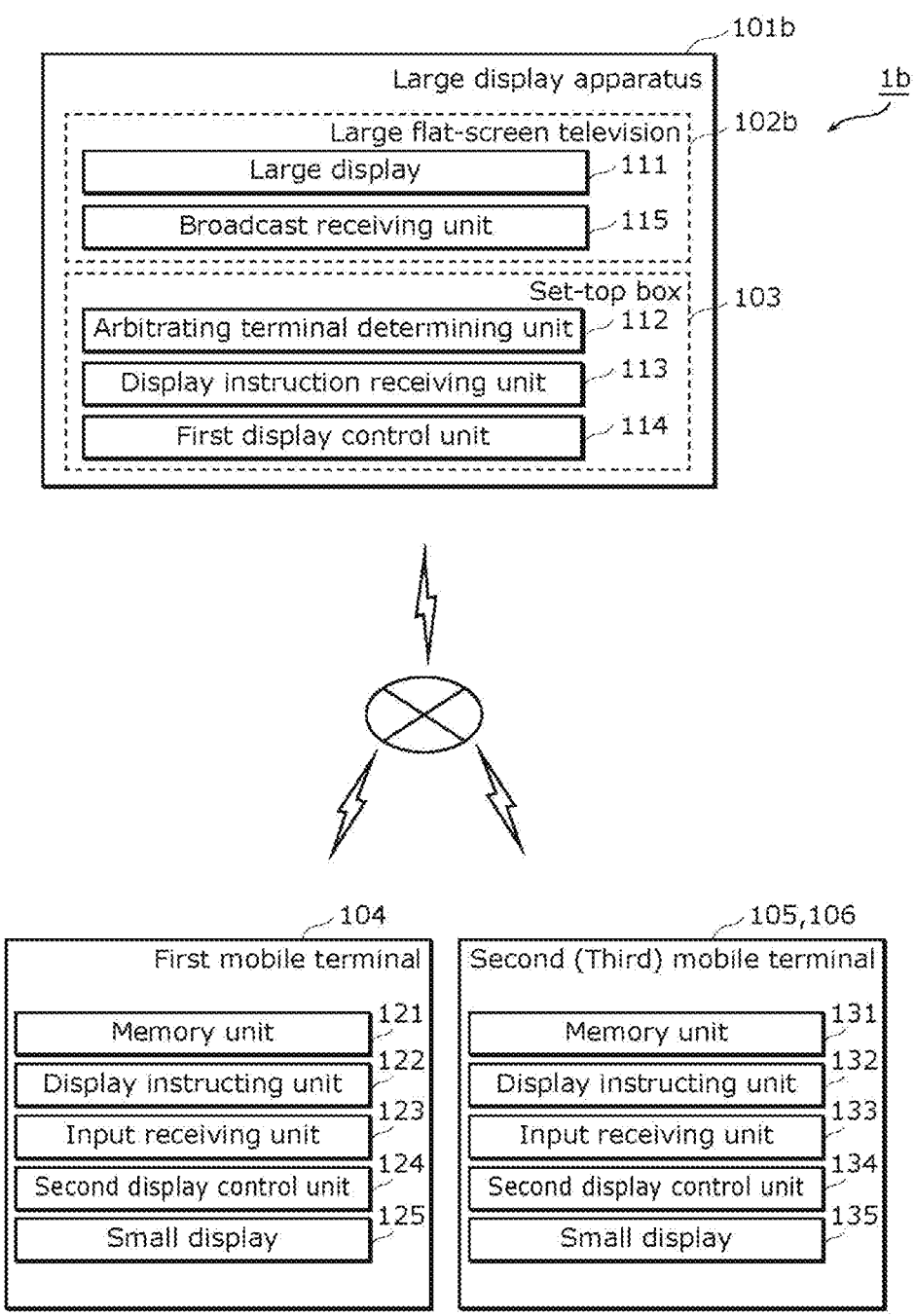
FIG. 12 is a functional block diagram of an image viewing system according to Embodiment 6.

FIG. 12 is a functional block diagram of an image viewing system 1b according to Embodiment 6. A large display apparatus 101b according to Embodiment 6 is different from the large display apparatus 101 of the image viewing systems 1 and is according to Embodiments 1 to 5 in that a large flat-screen television 102b of the large display apparatus 101b includes a broadcast receiving unit 115 capable of receiving television broadcast. It is to be noted that the large flat-screen television 102 according to Embodiments 1 to 5 may include the broadcast receiving unit 115.

When the first instruction is received from any one of the mobile terminals 104 to 106 while the television broadcast received by the broadcast receiving unit 115 is being displayed on the large display 111, the first display control unit 114 displays an image indicated by the first instruction on the large display 111.

More specifically, when the first instruction described in Embodiments 1 to 5 is issued by any one of the mobile terminals 104 to 106 while the user is having the television broadcast displayed on the large display 111 of the large display apparatus 101b, the image indicated by the first instruction is displayed on the large display 111. This means that the image viewing described in Embodiments 1 to 5 can be performed even when an application for the image viewing according to the image viewing method is not activated in the large display apparatus 101b.

Embodiment 7

Figure 13:
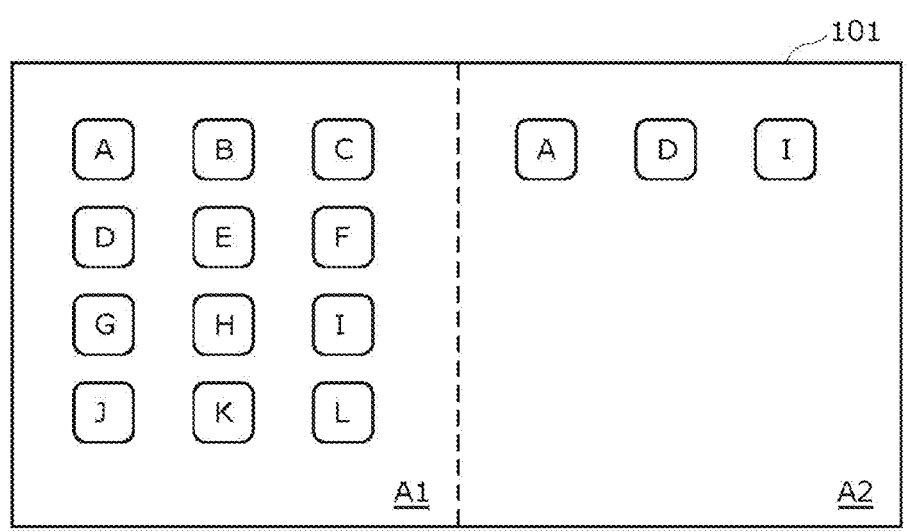
FIG. 13 shows icons of applications for displaying an image on a large display in an image viewing system according to Embodiment 7.

FIG. 13 shows icons of applications for displaying an image on the large display 111 in an image viewing system according to Embodiment 7. In Embodiment 7, icons of applications which can be operated by a mobile terminal connected to the network are changed according to a result of determination as to whether or not the mobile terminal connected to the network is the arbitrating terminal as described in Embodiment 1.

More specifically, the following considers the case where the first mobile terminal 104 is connected to the network and operates applications displayed on the large display apparatus 101. The first mobile terminal 104 is recognized as the arbitrating terminal by the large display apparatus 101, and thus can operate icons A to L of all the applications.

When the second mobile terminal 105 is connected to the network and attempts to the operate the applications displayed on the large display apparatus 101, the second mobile terminal 105 being a guest terminal cannot operate all the applications, and a guest screen is displayed on the large display 111 as shown in FIG. 13, for example. More specifically, when the guest terminal is connected to the network and the large display apparatus 101 recognizes the connection of the guest terminal, the screen of the large display 111 is divided into an owner screen region A1 and a guest screen region A2. In the owner screen region A1, the icons A to L indicating all the applications are displayed as being operable by the first mobile terminal 104, whereas in the guest screen region A2, only the applications A, D, and I which the guest terminal is permitted to use are displayed as being operable by the second mobile terminal 105.

In this case, the applications A, D, and I which the guest terminal is permitted to use are, for example, applications which do not disadvantage the owner, such as a browser which makes the Web viewing possible and image viewing software used for displaying images stored in the second mobile terminal 105 which is a guest terminal.

As described in Embodiment 7, when the second mobile terminal 105 being a guest terminal is connected to the network, the icons A, D, and I indicating the applications which the guest terminal is permitted to use are displayed, so that it is possible to restrict the use of applications which disadvantage the owner when activated by other users without permission, and allow the user recognized as a guest to easily use applications displayed on the large display apparatus 101, such as image viewing software.

The image viewing system, arbitrating terminal, image viewing method, and arbitrating method according to one or more embodiments of the present disclosure are to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure is useful as a digital image viewing system and so on which, when each of plural users has a smartphone, make image viewing using a large television possible, allow two or more people to smoothly view image data stored in plural small terminals, and allow images stored in the small terminals to be displayed on the large display apparatus without giving other users a sense of discomfort.

The invention claimed is:

1. An image viewing system comprising plural mobile terminals and a large display apparatus connected to each other via a network,
   each of the mobile terminals including:
   a memory unit configured to store one or more pieces of image data;
   an input receiving unit configured to receive a predetermined input for displaying on the large display apparatus an image indicated by a piece of image data selected by a user from among the one or more pieces of image data; and
   a display instructing unit configured to issue a first instruction to the large display apparatus to display on the large display apparatus the image indicated by the piece of image data selected by the user, based on the input received by the input receiving unit, and
   the large display apparatus including:
   a large display;
   an arbitrating terminal determining unit configured to determine, as an arbitrating terminal, one of the mobile terminals connected to the large display apparatus via the network, the arbitrating terminal being a terminal which performs arbitration for determining a manner in which the images indicated by the first instructions are to be displayed on the large display;
   a first display control unit configured to display on the large display the images indicated by the first instruction issued by the display instructing unit of each of the mobile terminals; and
   a display instruction receiving unit configured to receive the first instruction issued by the display instructing unit of each of the mobile terminals,
   wherein the large display apparatus determines whether or not at least two first instructions, issued by at least two mobile terminals including the arbitrating terminal among the mobile terminals, are received,
   wherein the first display control unit of the large display apparatus is configured to, when it is determined that the at least two first instructions are received,
   (a-1) display on the large display a first image based on the first instruction issued by the arbitrating terminal, and
   (a-2) display on the large display a second image based on each of the at least two first instructions issued by the at least two mobile terminals except the arbitrating terminal, in a second size smaller than a first size in which the first image is displayed,
   wherein the display instructing unit of the arbitrating terminal determined by the arbitrating terminal determining unit is further configured to perform the arbitration by (i) receiving the first instruction issued by the display instructing unit of each of the mobile terminals, and (ii) issuing, after the images indicated by the first instructions have been displayed on the large display, a second instruction to the large display apparatus to cause the first display control unit to change the manner in which the images are displayed on the large display, and
   wherein the arbitrating terminal determining unit is configured to determine, as the arbitrating terminal, one of the mobile terminals whose connection status with the network satisfies a predetermined condition.

2. The image viewing system according to claim 1, wherein when the second instruction is received from the arbitrating terminal, the first display control unit of the large display apparatus is configured to display, on the large display and in the first size, the second image displayed on the large display in the second size, based on the second instruction.

3. The image viewing system according to claim 1, wherein each of the mobile terminals further includes:
   a small display; and
   a second display control unit configured to control content displayed on the small display, and
   when the display instructing unit of the mobile terminal determined as the arbitrating terminal receives the first instructions from the display instructing units of the mobile terminals, the second display control unit of the mobile terminal determined as the arbitrating terminal is configured to display on the small display of the mobile terminal determined as the arbitrating terminal an indication that the first instructions have been received.

4. The image viewing system according to claim 3,
wherein the input receiving unit is configured to receive a gesture input as the predetermined input, and
when the input receiving unit receives the gesture input, the display instructing unit is configured to issue, as the first instruction, an instruction to the large display apparatus to display an image indicated by a piece of image data for which the gesture input has been made.

5. The image viewing system according to claim 4,
wherein the input receiving unit is configured to receive a flick input as the gesture input.

6. The image viewing system according to claim 5,
wherein each of the mobile terminals further includes
a direction determining unit configured to determine whether or not a direction of the flick input received by the input receiving unit is a direction from the mobile terminal to the large display apparatus, and
when the direction determining unit determines that the direction of the flick input is the direction from the mobile terminal to the large display apparatus, the display instructing unit is configured to issue, as the first instruction, an instruction to the large display apparatus to display an image indicated by a piece of image data for which the flick input has been made.

7. The image viewing system according to claim 4,
wherein when the gesture input received by the input receiving unit is a drag of the image indicating the piece of image data for a first predetermined distance or longer, the display instructing unit is configured to issue, as the first instruction, an instruction to the large display apparatus to display the image indicated by the piece of image data for which the gesture input has been made.

8. The image viewing system according to claim 7,
wherein when the gesture input received by the input receiving unit is the drag of the image indicating the piece of image data for the first predetermined distance or longer, the second display control unit is configured to display on the small display the image moving in a direction of the drag, and
when the gesture input received by the input receiving unit is a drag of the image indicating the piece of image data for a distance less than the first predetermined distance, the second display control unit is configured to display on the small display the image moving back to an original position.

9. The image viewing system according to claim 7,
wherein when the large display apparatus comprises plural large display apparatuses and the gesture input received by the input receiving unit is a drag of the image indicating the piece of image data for a second predetermined distance which is less than the first predetermined distance, the second display control unit is configured to display on the small display plural icons each corresponding to a different one of the large display apparatuses, and
the display instructing unit is configured to issue, as the first instruction, an instruction to display the image indicating the piece of image data, to one of the large display apparatuses which is indicated by one of the icons which corresponds to an end position of the drag.

10. The image viewing system according to claim 1,
wherein the first display control unit is configured to display on the large display of the large display apparatus an indication of the first instructions received by the display instruction receiving unit.

11. The image viewing system according to claim 1,
wherein the first display control unit is configured to display (i) the image indicated by the first instruction issued by the display instructing unit of at least one of the mobile terminals and (ii) information for identifying the at least one of the mobile terminals which has issued the first instruction.

12. The image viewing system according to claim 1,
wherein the large display apparatus further includes a broadcast receiving unit capable of receiving television broadcast, and
when the first instruction is received from any one of the mobile terminals while the television broadcast received by the broadcast receiving unit is being displayed on the large display, the first display control unit is configured to display the image indicated by the first instruction on the large display.

13. An arbitrating terminal which is one of the mobile terminals included in the image viewing system according to claim 1,
the display instructing unit of the arbitrating terminal being further configured to receive the first instruction issued by the display instructing unit of each of the mobile terminals, and issue a second instruction to the large display apparatus to cause the large display apparatus to change the manner in which the images are displayed by the large display apparatus.

14. An arbitrating method to be performed by the arbitrating terminal according to claim 13, the method comprising:
receiving the first instruction issued by the display instructing unit of each of the mobile terminals; and
issuing a second instruction to the large display apparatus to cause the large display apparatus to change the manner in which the images are displayed by the large apparatus.

15. The image viewing system according to claim 1,
wherein the arbitrating terminal determining unit is configured to determine the arbitrating terminal based on at least one of (i) a proximity of each of the mobile terminals to the large display apparatus, (ii) a password entered by a user of one of the mobile terminals, (iii) a timing at which each of the mobile terminals connects to the network, and (iv) a number of times each of the mobile terminals has connected to the network.

16. An image viewing method using an image viewing system having plural mobile terminals and a large display apparatus connected to each other via a network, the method comprising:
receiving, by an input receiving unit of each of the mobile terminals, a predetermined input for displaying on the large display apparatus an image indicated by a piece of image data selected by a user from among one or more pieces of image data;
issuing, by a display instructing unit of each of the mobile terminals, a first instruction to the large display apparatus to display on the large display apparatus the image indicated by the piece of image data selected by the user, based on the input received in the receiving;
receiving, by a display instruction receiving unit of the large display apparatus, the first instructions issued by the display instructing units;
determining, by the large display apparatus, one of the mobile terminals connected to the large display apparatus via the network as an arbitrating terminal, the arbitrating terminal being a terminal which performs arbitration for determining a manner in which the images indicated by the first instructions are to be displayed by the large display apparatus;

determining, by the large display apparatus, whether or not at least two first instructions, issued by at least two of the mobile terminals including the arbitrating terminal, are received;

displaying on the large display apparatus, when it is determined that the at least two first instructions are received, (a-1) a first image based on the first instruction issued by the arbitrating terminal, and (a-2) a second image based on each of the at least two first instructions issued by the at least two mobile terminals except the arbitrating terminal, in a second size smaller than a first size in which the first image is displayed;

receiving, by the one of the mobile terminals determined as the arbitrating terminal, the first instruction issued by the display instructing unit of each of the mobile terminals; and issuing, by the one of the mobile terminals determined as the arbitrating terminal, a second instruction to the large display apparatus to cause the large display apparatus to change the manner in which the images are displayed by the large display apparatus, wherein the one of the mobile terminals is determined as the arbitrating terminal based on at least one of (i) a proximity of each of the mobile terminals to the large display apparatus, (ii) a password entered by a user of one of the mobile terminals, (iii) a timing at which each of the mobile terminals connects to the network, and (iv) a number of times each of the mobile terminals has connected to the network.

* * * * *